Sept. 19, 1961    H. PANKUCH    3,000,130
AUDIBLE FISHING LURE
Filed Sept. 10, 1959
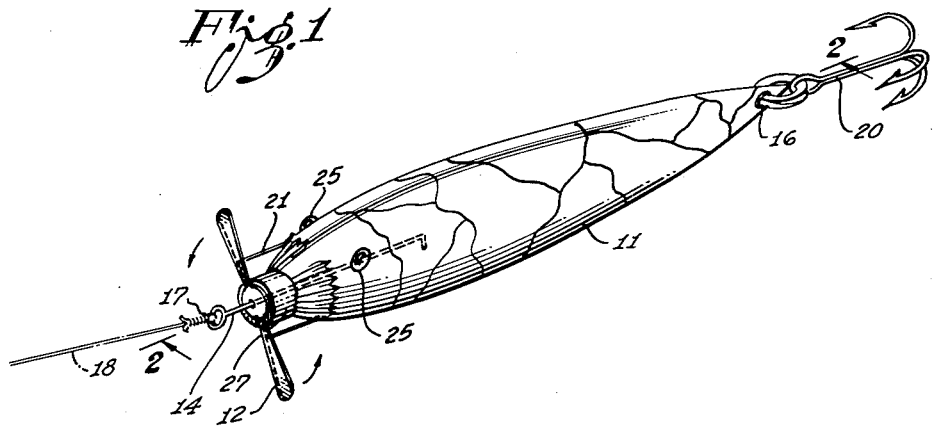
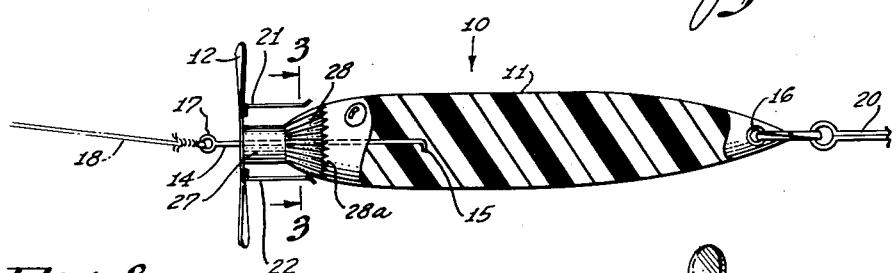
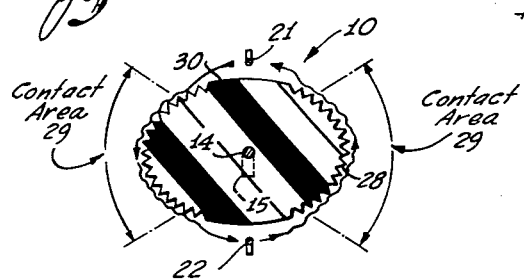
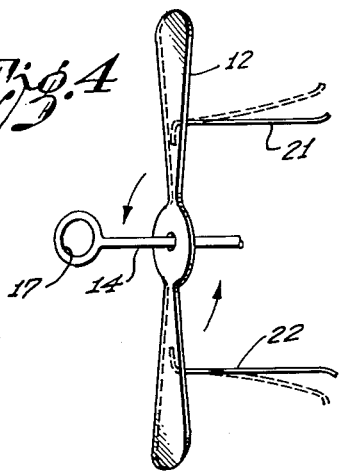
INVENTOR:
Henry Pankuch
Attorneys United States Patent Office 3,000,130
Patented Sept. 19, 1961

3,000,130
AUDIBLE FISHING LURE
Henry Pankuch, 1508 W. 101st St., Los Angeles, Calif.
Filed Sept. 10, 1959, Ser. No. 839,154
6 Claims. (Cl. 43—42.17)

This invention relates to fishing lures and, more particularly, to fishing lures which produce sounds simulating those of small animals, insects or amphibians.

In order to attract fish, lures have been designed which simulate the appearance of small fish and some have been designed to develop a buzzing sound. As is well known, the fish are attracted to the source of the sound. Prior audible lures have provided artificial continuous sound which do not actually resemble the sounds produced in nature. The sounds of small animals, insects or amphibians are generally not continuous buzzing sounds.

In a specific illustrative embodiment of this invention, an audible fishing lure is provided which generates an intermittent sound duplicating the intermittent sound produced by a small animal such as by a frog. The fishing lure has an elongate body which supports a bearing shaft at its forward end. The bearing shaft has an eye for engaging the end of a fishing line and may be partially embedded in the elongate body. The bearing shaft rotatably supports a propeller which is driven by the water as the fishing lure is pulled on the end of the fishing line through the water. The propeller supports one or more resilient arms which engage teeth at the forward end of the elongate body. The elongate body is elliptical in cross-section and the teeth are positioned at contact areas adjacent the intersection of the major axis and the circumference of the elliptic cross-section. As the propeller rotates on the bearing shaft, the resilient arms successively engage the teeth in the two contact areas of the elongate body to produce an audible tone. The teeth are successively engaged to produce an intermittent sound since the resilient arms contact the teeth during the same portions of their rotation with the propeller. Between contact areas the arms do not contact the teeth on the body so that a sound is not produced.

Further features of this invention relate to the provision of teeth at the forward end of the elongate body which are tapered. As the water passes through the grooves between the teeth the body is stabilized, being maintained in a stationary position with respect to the line 18 as the propeller rotates on the bearing shaft.

Further features and advantages of this invention will become apparent upon consideration of the following description when read in conjunction with the drawing wherein:

FIGURE 1 is a pictorial view of the fishing lure of this invention at the end of a fishing line;

FIGURE 2 is a side view of the fishing lure of this invention at the end of a fishing line with parts shown in section along line 2—2 of FIG. 1;

FIGURE 3 is a sectional view taken through lines 3—3 of FIGURE 2 illustrating the contact areas and the elliptical cross section of the elongate body; and FIGURE 4 is a pictorial view of the propeller and bearing shaft utilized in the fishing lure of this invention.

Referring to the figures, the fishing lure of this invention, which is designated generally by the reference number 10, includes an elongate body 11 which may be made of plastic. The plastic body 11 is molded over a bearing shaft 14 which has a bent distal end 15 for rigidly retaining it in the plastic body 11 after the body hardens. The bearing shaft 14 may be made of stainless steel. The plastic body 11 is also molded to form an opening 16 at its rear end for supporting a fish hook 20. The plastic body 11 may also include two eyes 25 and may have a color for simulating the appearance of a small fish.

The plastic body 11 is tapered at its front end and forms a neck 27 against which a propeller 12 rotates as the fishing lure 10 is drawn through the water. The propeller 12, which may be made of stainless steel, is rotatably supported on the bearing shaft 14. An eye 17 at the end of the shaft 14, which is utilized for engaging the end of a fishing line 18, may be formed after the propeller 12 is positioned on the shaft 14.

As the fishing lure 10 is drawn through the water at the end of the fishing line 18, the pressure of the water flowing adjacent the propeller 12 causes it to rotate in a counterclockwise direction when viewed from the left in FIGURES 1 and 2. The particular direction of rotation is merely illustrative as the operation of the fishing lure is exactly the same for either direction of rotation. The propeller 12 supports two resilient extensions or arms 21 and 22 which may be also made of stainless steel. The two arms 21 and 22 may be soldered or otherwise respectively affixed to the blades of the propeller 12. Though two arms 21 and 22 are illustrated in the figures, a single arm or three or four arms may also be used.

As the propeller 12 rotates, the resilient arms 21 and 22 successively contact a number of teeth 28 which are formed along the forward tapered circumference of the plastic body 11. As indicated particularly in FIGURE 3, the teeth 28 are arranged along two contact areas 29 which are at opposite sides of the body 11. The cross sectional shape of the body 11 is such that the teeth 28 in the contact areas 29 are formed along the surface of the body adjacent its intersection with the major axis of the ellipse. The length of the major axis at the body 11 adjacent the ends of the two arms 21 and 22 is greater than the distance between the ends of the two arms 21 and 22 when the arms 21 and 22 are not flexed or distorted. The minor axis of the elliptical cross section of the body 11, as illustrated also in FIGURE 3, is less than the distance between the ends of the arms 21 and 22. As the arms 21 and 22 rotate with the propeller 12, their ends, therefore, contact only the portions of the body 11 at the contact areas 29. The maximum deflection of the resilient arms 21 and 22 due to their engagement with the contact areas 29 is illustrated in FIGURE 4.

As the resilient arms 21 and 22 move across the teeth 28 in the two contact areas 29 they produce an audible tone having a pitch determined by the rotating speed of the propeller 12 and by a number of parameters determined when the fishing lure 10 is manufactured. These parameters, for example, include the spacing of the teeth 28, the material with which the teeth 28 and the arms 21 and 22 are made, etc. The arms 21 and 22 simultaneously move across the two opposite contact areas 29. As illustrated in FIGURE 3, the contact areas 29 form approximately ⅓ of the 360 degree rotation so that sound is produced only during ⅓ of each revolution. When the resilient arms 21 and 22 pass adjacent the minor axis of the body 11, they are no longer distorted and they do not engage any of the teeth 28 so that a sound is not produced. By drawing the fishing lure 10 through the water more quickly, the propeller 12 rotates more rapidly to produce an intermittent tone having a pitch which is higher and a spacing between the successive tones which is shorter. Because of the fact that the arms 21 and 22 do not engage the teeth 28 during a considerable portion of each revolution of the propeller 12, the propeller 12 gains considerable momentum during these portions of the revolution. The instantaneous speed of the propeller 12 varies in this manner throughout each revolution being faster between engagement of the contact areas 29 and slower when the contact areas 29 are engaged. The timing is therefore such that the tone intervals are produced over a duration which is greater than 1/3 of each revolution. Though in the specific illustrative embodiment, the contact areas 29 are engaged during only approximately 120 degrees of the 360 degree arc of the propeller 12, the duration during which the tone is produced and the duration between the tones may be substantially the same.

The present invention is not restricted to the particular elliptical configuration depicted in FIGURE 1 as other non-circular cross sections can be utilized to provide for the intermittent zone. Moreover, even a circular cross section could be utilized with a portion of the circumference not including any teeth. The resulting arrangement utilizing the resilient arms 21 and 22 on the propeller 12 provides for a relatively simple structure which is efficient for producing an intermittent tone simulating the sounds produced by small animals or amphibians such as frogs.

The teeth 28, as depicted somewhat in FIGURE 2, are tapered to smoothly join the circumference of the body 11. The teeth 28 and the grooves therebetween extend towards the rear end of the elongate body 11. The water, which is somewhat turbulent after passage adjacent the propeller 12, passes adjacent the contact areas 29. The grooves between the tapered teeth 28 function to steer the flowing water along diverging lines adjacent the rest of the body 11. The teeth 28 function, therefore, as stabilizers to prevent the rotation of the body 11. The body 11 does not rotate with the propeller 12 as the fishing lure 10 is pulled through the water at the end of the line 18 even though a slight rotating torque is imparted thereto by the arms 21 and 22 as the propeller 12 rotates. Not only may the teeth 28 be utilized as stabilizers, but at a slight angle with respect to the longitudinal axis of the body 11, they may develop a rotating torque to counteract the torque provided to the body 11 by the arms 21 and 22.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. An audible fishing lure for simulating the sounds produced by a particular small animal attractive to fish when pulled through water on a fish line, including, an elongate body having a number of teeth at its forward end, means supported at the rear end of said body to which a hook may be connected, a shaft supported at the forward end of said body including an eye to which the fish line may be attached, a rotatable member supported on said shaft and having at least one surface area at an angle to the direction of movement of the lure through the water, said member being rotated on said shaft responsive to the pressure of the water against said surface area as the fishing lure is pulled through the water by the fish line, and at least one resilient arm mounted on said rotatable member and having one end resiliently positioned against said teeth at the forward end of said body for producing a predetermined intermittent sound simulating the sound produced by the particular small animal as said member rotates.

2. An audible fishing lure for simulating the sounds produced by a particular small animal attractive to fish when pulled through water on a fish line, including, an elongate body having a width which is greater than its height, and having a forward and a rear end, said body also having sides, a top and a bottom, and a plurality of grooves at its sides adjacent its forward end, said grooves extending generally along the direction from the forward end of said elongate body towards the rear end of said elongated body, means supported at the rear end of said body to which a hook may be connected, a shaft supported at the forward end of said body including an eye to which the fish line may be attached, a propeller rotatably mounted on said shaft which rotates responsive to the pressure of the water as the lure is pulled through the water, and at least one resilient contacting member affixed to and rotatable with said propeller, said member having a free end which is urged along a path intersecting the sides of the forward end of said body as said propeller rotates but which path clears the top and bottom of the forward end of said body whereby an intermittent sound is produced as the member successively engages the grooves at the sides of the forward end of said body during the rotation of the propeller.

3. An audible fishing lure for simulating the sounds produced by a particular small animal attractive to fish when pulled through water on a fish line, including, an elongate body having a substantially elliptically shaped cross-section and two toothed areas at its forward end adjacent the ends of the major axis of the elliptically shaped cross-section, the two toothed areas such each including alternate teeth and grooves extending towards the rear end of said elongate body, means supported at the rear end of said body to which a hook may be connected, a shaft supported at the forward end of said body including an eye to which the fish line may be attached, a propeller rotatably mounted on said shaft which rotates responsive to the pressure of the water as the lure is pulled through the water, and at least one resilient contacting member affixed to and rotatable with said propeller, said member having a free end for successively engaging the teeth in each of said toothed areas to produce an intermittent sound, the free end of said contacting member being normally positioned at a distance from said shaft which is greater than the minor radius of the elliptically shaped cross-section of the body at its forward end.

4. An audible fishing lure for producing intermittent sounds at a predetermined pitch and spacing between sounds including, an elongate body having a plurality of intergral ridges at its forward end which extend towards the rear end of the body, the forward end of said body being tapered forwardly, said ridges being arranged in spaced groups, means supported at the rear end of said body to which a hook may be connected, a shaft supported at the forward end of said body including an eye to which the fish line may be attached, and a propeller rotatably mounted on said shaft which rotates responsive to the pressure of the water as the fishing lure is drawn through the water, a flexible reed affixed to said propeller extending rearwardly from said propeller and having a free end for successively contacting said ridges as said propeller rotates on said shaft.

5. An audible fishing lure in accordance with claim 4 wherein said elongate body has a cross-section shape at its forward end which has a larger and a smaller dimension, said spaced groups of said ridges being located on opposite sides of said body across the larger dimension of said cross-section shape.

6. An audible fishing lure for producing sounds when pulled through the water on a fish line, including an elongated body having a number of teeth at one end, a shaft supported at the one end of the body to which a fish line may be attached, a propeller supported on the shaft which is rotated on the shaft responsive to the pressure of the water as the fishing lure is pulled through the water by the fish line, and at least one resilient arm mounted on said propeller and having one end resiliently positioned against said teeth for producing a sound as the propeller rotates.

References Cited in the file of this patent

UNITED STATES PATENTS

| | | |
|---|---|---|
| 2,234,837 | Allen | Mar. 11, 1941 |
| 2,833,078 | Peltz | May 6, 1958 |
| 2,853,826 | Romeo | Sept. 30, 1958 |
| 2,881,548 | Backe | Apr. 14, 1959 |